(No Model.)
F. A. JONES.
FOUNTAIN PEN FOR RECORDING INSTRUMENTS.
No. 581,121. Patented Apr. 20, 1897.
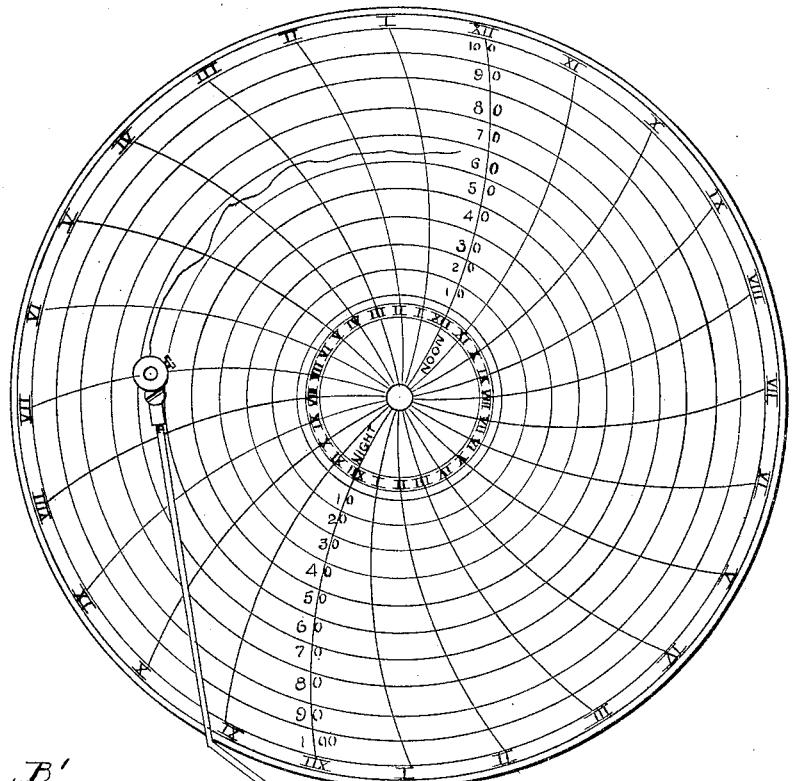
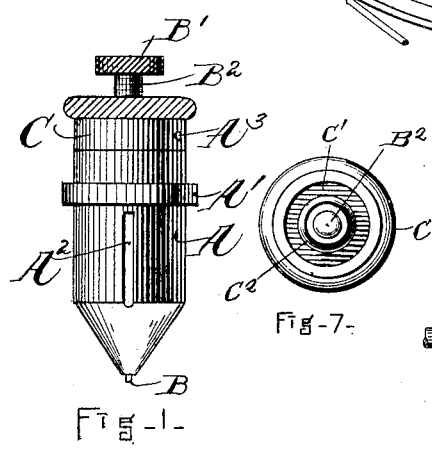
Fig-5.
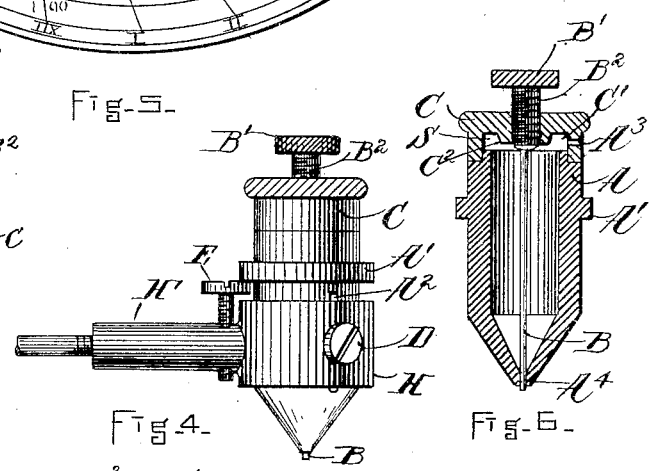
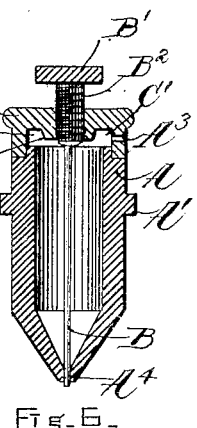
Fig-1. Fig-7. Fig-4. Fig-6.
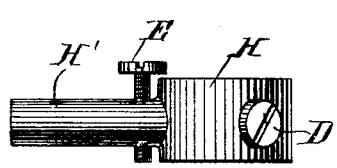
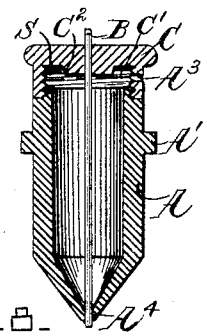
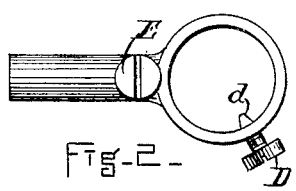
Fig-3. Fig-8. Fig-2.
WITNESSES—
Chas. S. Gooding.
Wm. H. Varnum.
INVENTOR—
Florentine A. Jones

UNITED STATES PATENT OFFICE.

FLORENTINE A. JONES, OF MALDEN, MASSACHUSETTS.

FOUNTAIN-PEN FOR RECORDING INSTRUMENTS.

SPECIFICATION forming part of Letters Patent No. 581,121, dated April 20, 1897.

Application filed September 1, 1894. Serial No. 521,913. (No model.)

*To all whom it may concern:*

Be it known that I, FLORENTINE A. JONES, of Malden, in the county of Middlesex and State of Massachusetts, have invented a new and useful Improvement in Fountain-Pens, of which the following, taken in connection with the accompanying drawings, is a specification.

My invention relates to that class of fountain-pens that are used for tracing or marking ink-lines upon moving charts or dials as used in self-recording instruments.

The objects of the invention are to so construct a pen and its connecting parts that it will make a line of uniform width and character under varying pressure; to provide for adjustment of the same, so as to give a finer or coarser line, as may be desired; to prevent the displacement and consequent flowing of the ink over the outside of the pen and thus soiling it and its connecting parts in the act of closing the pen after it has been filled; to so arrange and construct the holding parts that the pen may be removed and replaced without changing its position in the holder or its adjustment or pressure in its relation to the chart or dial, and to prevent the pen-clamping screw from injuring the outer bearing-surface of the pen and thereby affect its adjustment in the penholder. These objects I attain by the mechanism shown in the accompanying drawings, in which—

Figure 1 is an elevation of the pen proper. Fig. 2 is a plan view of the penholder with the clamping and adjusting screws. Fig. 3 is an elevation of the penholder, showing the clamping and adjusting screws. Fig. 4 shows the pen and its holder in elevation. Fig. 5 shows in plan a chart or dial indicating the relation of the pen to the chart when working, also showing a line as made by the pen. Fig. 6 shows one of my pens in vertical section. Fig. 7 shows the under side of the cap of the pen. Fig. 8 shows in vertical section a pen having a cap adapted to admit of the adjustment of the regulating-wire without the use of an adjusting-screw.

The relation of the pen to the dial to which it is applied is shown in Fig. 5, in which the dial is represented as circular. It is obvious, however, that the pen may be applied equally well to any style of chart or ribbon.

The pen consists of a body part A. (Shown in elevation in Fig. 1 and in section in Figs. 6 and 8.) The pen has an opening $A^4$ at the bottom, through which the regulating-wire B extends in unyielding contact with the recording-surface, and by means of this wire the ink is brought in contact with the recording-surface. It is attached at its upper end to an adjusting-screw $B'$ $B^2$, which is affixed in the cap C of the pen. A small vent-hole is made in the cap of the pen, as shown at $A^3$, Figs. 1 and 6, to allow air to enter the interior of the pen and thus allow the ink to freely pass out through the opening $A^4$ and also permit the escape of the air which is between the cap and the ink when in the act of replacing the cap after filling the pen.

I illustrate my pen as having the annular ring or flange $A'$ entirely encircling the outside of the pen, because it is the best and most preferable manner to form a stop to make contact with the adjusting-screw E, the function of which will be explained hereinafter. One reason why it is preferable to forming, affixing, or applying an ear or any special projection on the body of the pen or to forming a shoulder upon the pen by reducing that portion of the pen which enters the holder and leaving the remaining portion of greater diameter to form a raised surface or shoulder is because none of these will prevent the ink which may overflow or be spilled over the edge of the pen in filling from running down the outer surface of the pen and gumming it to the holder unless care is taken to clean thoroughly. It will, however, be understood that any of these forms would be the equivalent of the raised surface or projection $A'$, inasmuch as they would perform the function as a stop equally as well as the annular ring or flange shown.

The cap C of the pen is formed with a boss $C^2$, so as to leave an annular space S between it and the wall $C'$ of the cap. (See Figs. 6 and 8.) The object of this arrangement is to obtain greater thickness of bearing for the thread of the screw without adding to the length of the pen, and also to have an open space in the cap above the upper edge of the pen in order to be able to place the vent-hole in the cap above the ink when the body of the pen is filled, so that the air may escape.

Otherwise, if there was no open space above the ink in which to place the vent-hole then the ink would be forced out of the latter in the act of replacing the cap after filling the pen. Again, the clear space in the cap affords a place for the ink when the screw or the projection $C^2$ comes in contact with the ink, and it will not be forced out onto the outside of the pen and soil it. By preventing the ink from getting onto the outside of the pen the annoyance caused by the ink in gumming and sticking to the pen and its holder is avoided.

By attaching the regulating-wire B to the cap by the intervention of the adjusting-screw $B'$ $B^2$, I am enabled to readily obtain a very fine adjustment of the wire B in relation to the hole $A^4$ in the working end of the pen. This adjustment is very important, as the width of the line drawn by the pen depends wholly upon it.

The adjustment of the wire B may be effected by having it fit "friction-tight" in the cap, as shown in Fig. 8. To all intents and purposes the screw $B'$ $B^2$ in Fig. 6 forms a part of the wire, so that in Figs. 1 to 6 and also in Fig. 8 the solid ink-regulating wire extends through the cap and is rigidly or non-yieldingly fixed therein.

The holder H H' (see Figs. 3 and 4) consists of a ring H and a shank H'.

D $d$ is a set-screw which passes through the ring, and its end $d$ is made to enter the groove $A^2$ of the outside of the pen. (See Figs. 1 and 4.) Thus the bearing-surface of the pen in contact with the holder H will not be roughened and made so as not to fit its holder accurately.

The longitudinal adjustment of the pen is effected by use of the adjusting-screw E, the head of which rests under the annular ring or flange $A'$, as shown in Fig. 4. It is obvious that by turning the screw E its head may be raised or lowered in relation to the holder, and as the position of the pen is determined by the ring or flange $A'$ and the head of the screw E, in conjunction with the depressed surface $A^2$ and the point $d$ of the set-screw D, it follows that this device forms a convenient and accurate means of fixing the position of the pen in relation to the chart and that the proper tension or pressure between the pen and chart may be maintained.

The wire which projects at all times through and beyond the outer surface of the ink-orifice may be regarded as "fixed unrecedingly" therein, and the term is employed to distinguish it from those wires which are yielding or which fit the orifices so tightly as to require to be withdrawn in the operation of writing. The flow of the ink depends upon the extent to which the wire projects beyond the end of the orifice—that is to say, if the wire projects too far the ink will clog and dry before it reaches the paper on account of the surface over which it must flow, and if it does not project far enough it will flow so freely as to spread and blot. Hence in order that the ink may flow freely and in the proper amount to make a desirable clear line the wire must be capable of fine adjustment, so that the end thereof may be projected to the exact degree to expose the extent of surface required. The ink flows in the space between the wire and the walls of the orifice, so that the adjustment of the wire in no wise enlarges or diminishes the space, but, on the contrary, lengthens or shortens the projecting end of the wire to retard or hasten the flow of the ink. It has heretofore been proposed to employ a wire secured to a threaded cap, but the wire tightly fitted the orifice and required to be withdrawn therefrom before the pen could be employed for working or writing purposes, whereas in my improved pen the end of the wire projects unyieldingly and unrecedingly at all times through the orifice and beyond the outer surface thereof and is adjusted, as has just been said, for regulating the flow of the ink.

Having thus explained the nature and described the various parts and features of my invention, without attempting to set forth any of the modifications of which it is capable, what I claim is—

1. In a reservoir-pen, the combination with the body of the pen, and the cap therefor, of a solid ink-regulating wire extending through the cap and non-yieldingly fixed therein, and always extending through and beyond the outer surface of the delivering-orifice of the pen.

2. In a reservoir-pen, the combination with the body of the pen, and the cap therefor, of a solid ink-regulating wire extending through the cap and non-yieldingly fixed therein, and having a point of uniform diameter extending always through and beyond the outer surface of the delivering-orifice of the pen.

3. In a reservoir-pen, the combination with the hollow body part for receiving the ink, of a cap for closing the upper end thereof, said cap having an annular space communicating with the interior of the pen but located above the upper end of the said body, and a vent-hole leading into the said space, all for the purposes set forth.

4. In a reservoir-pen, the combination with the body of the pen, and a cap therefor, of an adjusting-screw secured to an ink-regulating wire, said wire always projecting through and beyond the outer surface of the delivering-orifice of the pen, and unrecedingly fixed.

5. A reservoir-pen for a recording instrument, having its body part provided with an exterior longitudinal groove, and an annular ring or flange, in combination with a holder having an adjusting-screw engaging the ring or flange to adjust the pen, and having a set-screw entering the said groove, to guide the pen during its adjustment and to clamp it when adjusted, whereby the position of the pen relatively to the chart will not be affected after being filled and replaced.

6. A reservoir-pen for a recording instrument, having a hollow body part for the ink, and a cap for closing the upper end thereof, said body part having an annular flange or ring, in combination with a holder for the pen arranged beneath the flange, whereby the latter prevents ink from running down on the holder, and said holder having an adjusting-screw engaging said flange to adjust the pen in the holder, as set forth.

In testimony whereof I have signed my name to this specification, in the presence of two subscribing witnesses, on this 31st day of August, A. D. 1894.

FLORENTINE A. JONES.

Witnesses:
  EDWARD B. MANATON,
  EDGAR S. HILL.